(12) United States Patent
Hutsell et al.

(10) Patent No.: US 7,647,467 B1
(45) Date of Patent: Jan. 12, 2010

(54) TUNING DRAM I/O PARAMETERS ON THE FLY

(75) Inventors: Brian D. Hutsell, Fort Worth, TX (US); Sameer M. Gauria, Mountain View, CA (US); Philip R. Manela, Saratoga, CA (US); John A. Robinson, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 469 days.

(21) Appl. No.: 11/642,368

(22) Filed: Dec. 19, 2006

Related U.S. Application Data

(60) Provisional application No. 60/808,694, filed on May 25, 2006.

(51) Int. Cl.
*G06F 12/00* (2006.01)
(52) U.S. Cl. .................. 711/170; 711/105; 714/721
(58) Field of Classification Search ............... 711/170, 711/105; 714/721
See application file for complete search history.

(56) References Cited

U.S. PATENT DOCUMENTS

| | | | |
|---|---|---|---|
| 4,795,985 A | 1/1989 | Gailbreath, Jr. |
| 6,043,694 A | 3/2000 | Dortu |
| 6,137,851 A | 10/2000 | Erickson et al. |
| 6,150,863 A | 11/2000 | Conn et al. |
| 6,154,498 A | 11/2000 | Dabral et al. |
| 6,178,212 B1 | 1/2001 | Akashi |
| 6,373,289 B1 | 4/2002 | Martin et al. |
| 6,373,305 B1 | 4/2002 | Stine |
| 6,496,043 B1 | 12/2002 | Moss et al. |
| 6,570,944 B2 | 5/2003 | Best et al. |
| 6,600,681 B1 | 7/2003 | Karger et al. |
| 6,622,256 B1 | 9/2003 | Dabral et al. |
| 6,690,201 B1 | 2/2004 | Simkins et al. |
| 6,798,241 B1 | 9/2004 | Bauer et al. |
| 6,816,991 B2 | 11/2004 | Sanghani |
| 6,864,715 B1 | 3/2005 | Bauer et al. |
| 6,889,334 B1 | 5/2005 | Magro et al. |
| 6,940,768 B2 | 9/2005 | Dahlberg et al. |
| 7,038,971 B2 | 5/2006 | Chung |
| 7,042,252 B2 | 5/2006 | Galloway et al. |
| 7,107,424 B1 | 9/2006 | Avakian |
| 7,123,051 B1 | 10/2006 | Lee et al. |
| 7,157,948 B2 | 1/2007 | McClannahan et al. |
| 7,187,598 B1 | 3/2007 | Daugherty et al. |

(Continued)

*Primary Examiner*—Christian P Chace
*Assistant Examiner*—Hashem Farrokh
(74) *Attorney, Agent, or Firm*—Townsend and Townsend and Crew LLP

(57) ABSTRACT

On the fly tuning of parameters used in an interface between a memory (e.g. high speed memory such as DRAM) and a processor requesting access to the memory. In an operational mode, a memory controller couples the processor to the memory. The memory controller can also inhibit the operational mode to initiate a training mode. In the training mode, the memory controller tunes one or more parameters (voltage references, timing skews, etc.) used in an upcoming operational mode. The access to the memory may be from an isochronous process running on a graphics processor. The memory controller determines whether the isochronous process may be inhibited before entering the training mode. If memory buffers for the isochronous process are such that the training mode will not impact the isochronous process, then the memory controller can enter the training mode to tune the interface parameters without negatively impacting the process.

16 Claims, 5 Drawing Sheets

U.S. PATENT DOCUMENTS

| | | |
|---|---|---|
| 7,210,050 B2 | 4/2007 | Dabral |
| 7,259,606 B2 | 8/2007 | Ku et al. |
| 7,366,862 B2 | 4/2008 | Nystuen et al. |
| 7,386,765 B2 * | 6/2008 | Ellis et al. .................... 714/42 |
| 7,457,913 B2 * | 11/2008 | Dietrich et al. ............. 711/105 |
| 2001/0046163 A1 | 11/2001 | Yanagawa |
| 2002/0099987 A1 | 7/2002 | Corbin et al. |
| 2002/0122514 A1 | 9/2002 | Hofmann et al. |
| 2003/0117864 A1 | 6/2003 | Hampel et al. |
| 2004/0000940 A1 | 1/2004 | Chang |
| 2004/0012612 A1 * | 1/2004 | Chan et al. ................... 345/619 |
| 2006/0052961 A1 * | 3/2006 | Best ........................... 702/106 |
| 2007/0016835 A1 * | 1/2007 | Hronik et al. ............... 714/727 |

* cited by examiner

US 7,647,467 B1

TUNING DRAM I/O PARAMETERS ON THE FLY

CROSS-REFERENCES TO RELATED APPLICATIONS

This application claims the benefit of U.S. Provisional Application No. 60/808,694, filed May 25, 2006, entitled "Tuning Dram I/O Parameters On The Fly," the disclosure of which is incorporated herein by reference in their entirety.

BACKGROUND OF THE INVENTION

In a typical personal computer system, a processor of the system uses a memory controller to access (write to and/or read from) memory. The memory controller receives an access request from the processor and generates appropriate interface (input/output, "I/O") signals to the appropriate memory chips (e.g., DRAMs) to service the request.

A difficult aspect of working with DRAM or other high-speed memory devices is resolving timing requirements of the DRAM integrated circuits (ICs or "chips"). DRAMs are generally independently clocked and respond to input signals as they occur.

Accordingly, the memory controller must generate interface signals to the DRAM chips with appropriate timing and other interface parameters (e.g., driver impedance). As long as the memory controller applies the appropriate signals in the proper sequence with signal durations and delays between signals that meet specified limits, and with proper drive levels, impedance, etc., the DRAM will generally work acceptably well.

To determine the appropriate interface parameters, a range of DRAM chips is typically characterized by engineers designing the computer system. For example, engineers may experimentally or by simulation determine the appropriate timing and other interface parameters that work acceptably across possible variations caused by "process corners" (manufacturing variations across a number of DRAM and memory controller chips), voltage and/or temperature variations during operation, and the like.

To generate the appropriate timing and other interface parameters during system operation, the memory controller typically includes one or more system configuration registers. The system configuration registers store digital values for the interface settings to be used to access the particular DRAM ICs in the system. For example, the system configuration registers store interface parameters such as setup/hold timing, and so on.

Typically, the system configuration registers in the memory controller are configured at initialization of the computer system after hardware reset, e.g. from values stored in a boot ROM. The system configuration registers are usually configured only once upon initialization. Such predetermined timing and other interface parameters ensure that the system should work over the range of voltage and temperature considered during the design of the system.

BRIEF SUMMARY OF THE INVENTION

A limitation with selecting predetermined timing and other interface parameters for use with high-speed memory chips is that the predetermined parameters may be suboptimal with respect to specific DRAM chips in a computer. Additionally, the predetermined interface parameters may be suboptimal at any point in time after initialization, since using predetermined parameters ignores changes that may occur after initialization. For example, there may be a "sweet spot" of operation in which components within a system are particularly well matched. The location of the sweet spot may move based on voltage, temperature, or other operating conditions.

One general goal of tuning as described further herein is to find where that sweet spot is for current operating conditions. Accordingly, the systems and methods disclosed herein provide "on the fly tuning" of parameters used in an interface between a memory (e.g. high speed memory such as DRAM) and a circuit requesting access to the memory. The interface parameters may be adjusted during operation to accommodate or respond to changes in the interface.

In one aspect, a system comprises a memory, a processor configured to request an access to the memory, and a memory controller. In an operational mode, the memory controller is configured to couple the processor to the memory using one or more interface parameters. The memory controller is also configured to inhibit the operational mode to enter a training mode. In the training mode, the memory controller tunes one or more interface parameters used in the operational mode.

In another aspect, a memory controller is configured to couple a processor to a memory in an operational mode using one or more interface parameters. The memory controller is also configured to inhibit the operational mode to enter a training mode. In the training mode, the memory controller tunes one or more interface parameters used in the operational mode.

In a further aspect, a method comprises coupling a processor to a memory with a memory controller in an operational mode. The memory controller uses one or more interface parameters in the operational mode. The method include inhibiting the operational mode to enter a training mode. In the training mode, one or more interface parameters used in the operational mode are tuned.

DETAILED DESCRIPTION OF THE INVENTION

The systems and methods disclosed herein provide "on the fly" (during operation) tuning of parameters used in an interface between a memory (e.g. high speed memory such as DRAM) and a processor (or more generally, a circuit) requesting access to the memory. During an operational mode, a memory controller couples the processor to the memory. The memory controller can also inhibit the operational mode to initiate a training mode. In the training mode, the memory controller tunes one or more parameters (a voltage reference, timing skews, etc.) to be used in an upcoming operational mode.

An exemplary system for tuning of DRAM interface parameters includes a computer system with a graphics processing subsystem. The graphics processing subsystem uses a memory controller to access graphics memory, and can do so at very high speed. Often, the graphics memory acts as a bottleneck in that the graphics processing subsystem can generate access requests for the graphics memory faster than the graphics memory can respond to the requests. In such case, tuning the interface parameters can provide increased overall memory bandwidth, improved error margin, or other improved performance characteristics. Although described with respect to a graphics processing subsystem and a graphics memory, persons of ordinary skill in the art will recognize that the systems and methods disclosed herein are broadly applicable to virtually any interface between a memory and a circuit requesting access to the memory, and are not limited to the disclosed embodiments.

Exemplary Computing Architecture

Figure 1:
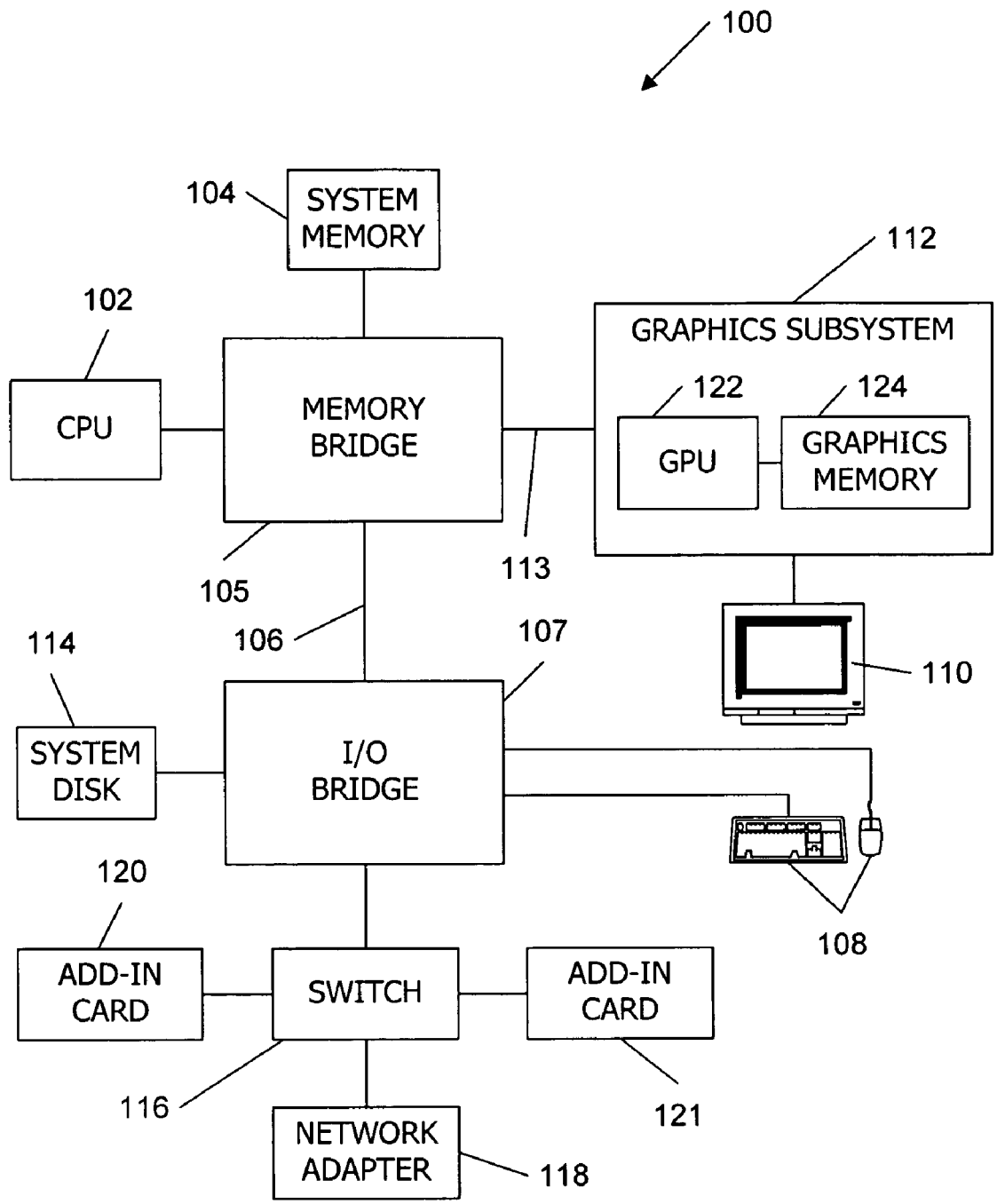
FIG. 1 is a block diagram of a computer system 100 according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a conventional Northbridge chip, is connected via a bus or other communication path 106 (e.g., a HyperTransport link) to an I/O (input/output) bridge 107. I/O bridge 107, which may be, e.g., a conventional Southbridge chip, receives user input from one or more user input devices 108 (e.g., keyboard, mouse) and forwards the input to CPU 102 via bus 106 and memory bridge 105. Visual output is provided on a pixel based display device 110 (e.g., a conventional CRT or LCD based monitor) operating under control of a graphics subsystem 112 coupled to memory bridge 105 via a bus or other communication path 113, e.g., a PCI Express (PCI-E) or Accelerated Graphics Port (AGP) link. A system disk 114 is also connected to I/O bridge 107. A switch 116 provides connections between I/O bridge 107 and other components such as a network adapter 118 and various add-in cards 120, 121. Other components (not explicitly shown), including USB or other port connections, CD drives, DVD drives, and the like, may also be connected to I/O bridge 107. Bus connections among the various components may be implemented using bus protocols such as PCI (Peripheral Component Interconnect), PCI-E, AGP, HyperTransport, or any other bus or point-to-point communication protocol(s), and connections between different devices may use different protocols as is known in the art.

Graphics processing subsystem 112 includes a graphics processing unit (GPU) 122 and a graphics memory 124, which may be implemented, e.g., using one or more integrated circuit devices such as programmable processors, application specific integrated circuits (ASICs), and memory devices. GPU 122 may be configured to perform various tasks related to generating pixel data from graphics data supplied by CPU 102 and/or system memory 104 via memory bridge 105 and bus 113, interacting with graphics memory 124 to store and update pixel data, and the like. For example, GPU 122 may generate pixel data from 2-D or 3-D scene data provided by various programs executing on CPU 102. GPU 122 may also store pixel data received via memory bridge 105 to graphics memory 124 with or without further processing. GPU 122 also includes a scanout module configured to deliver pixel data from graphics memory 124 to display device 110.

CPU 102 operates as the master processor of system 100, controlling and coordinating operations of other system components. In particular, CPU 102 issues commands that control the operation of GPU 122. In some embodiments, CPU 102 writes a stream of commands for GPU 122 to a command buffer, which may be in system memory 104, graphics memory 124, or another storage location accessible to both CPU 102 and GPU 122. GPU 122 reads the command stream from the command buffer and executes commands asynchronously with operation of CPU 102. The commands may include conventional rendering commands for generating images as well as general-purpose computation commands that enable applications executing on CPU 102 to leverage the computational power of GPU 122 for data processing that may be unrelated to image generation.

It will be appreciated that the system shown herein is illustrative and that variations and modifications are possible. The bus topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, graphics subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of GPU 122 to the rest of system 100 may also be varied. In some embodiments, graphics system 112 is implemented as an add-in card that can be inserted into an expansion slot of system 100. In other embodiments, a GPU is integrated on a single chip with a bus bridge, such as memory bridge 105 or I/O bridge 107.

A GPU may be provided with any amount of local graphics memory, including no local memory, and may use local memory and system memory in any combination. For instance, in a unified memory architecture (UMA) embodiment, no dedicated graphics memory device is provided, and the GPU uses system memory exclusively or almost exclusively. In UMA embodiments, the GPU may be integrated into a bus bridge chip or provided as a discrete chip with a high-speed bus (e.g., PCI-E) connecting the GPU to the bridge chip and system memory.

It is also to be understood that any number of GPUs may be included in a system, e.g., by including multiple GPUs on a single graphics card or by connecting multiple graphics cards to bus 113. Multiple GPUs may be operated in parallel to generate images for the same display device or for different display devices.

In addition, GPUs embodying aspects of the present invention may be incorporated into a variety of devices, including general purpose computer systems, video game consoles and other special purpose computer systems, DVD players, handheld devices such as mobile phones or personal digital assistants, and so on.

Tuning Memory Interface Parameters

In the embodiments of FIG. 1, GPU 122 can access memories such as graphics memory 124 at very high speed (e.g., 56 GB/sec in some embodiments). Typically, though, graphics memory 124 is bandwidth-limiting in that GPU 122 can execute instructions that generate memory access requests at a faster rate than graphics memory 124 can respond to the memory access requests. Therefore, the systems and methods disclosed herein are advantageous for tuning the interface parameters to maximize the memory interface bandwidth between GPU 122 and graphics memory 124.

Figure 2:
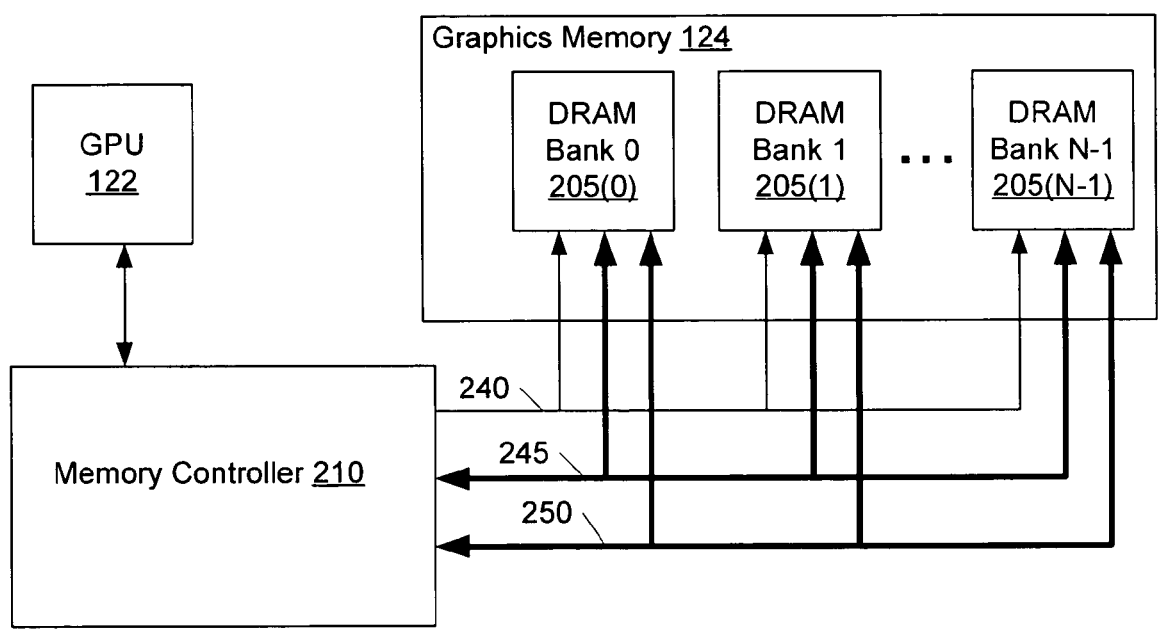
FIG. 2 illustrates a memory controller 210 configured to couple GPU 122 to graphics memory 124 in one embodiment of the invention.

FIG. 2 illustrates a memory controller 210 configured to couple GPU 122 to graphics memory 124 in one embodiment of the invention. Graphics memory 124 includes a number of banks (N, e.g. 4) of DRAM memory 205. As described further below, memory controller 210 is configured to couple GPU 122 to the appropriate DRAM memory 205 during an operational mode. In the operational mode, memory controller 210 accesses the appropriate DRAM memory 205 via a number of well-known interface signals, such as data strobe (DQS) 240, data (DQ) 245, and address and control bus 250. Other interface signals may be included between memory controller 210 and graphics memory 124 as is well-known, but are omitted for the sake of clarity of description.

Figure 3A:
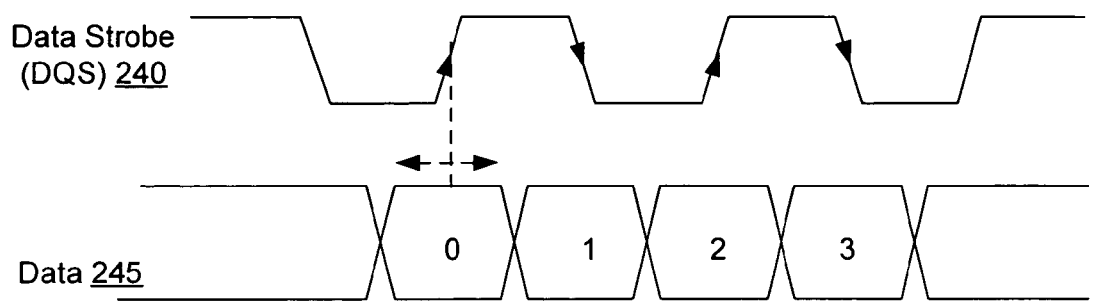
FIG. 3A illustrates simplified exemplary timing information for data strobe (DQS) 240 and four data bits (DQ) 245 for a DRAM memory 205 using 4-bit bursts.
Figure 3B:
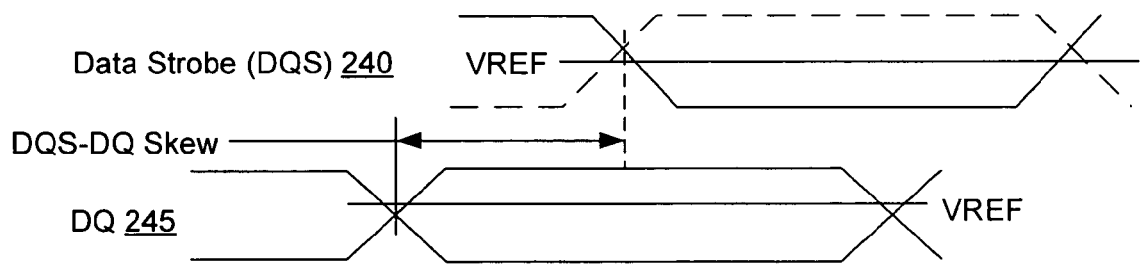
FIG. 3B illustrates a simplified exemplary expansion of strobe/data timing for rising and falling edges of DQS 240 and DQ 245 of FIG. 3A.

FIG. 3A illustrates simplified exemplary timing information for data strobe (DQS) 240 and four data bits (DQ) 245 for a DRAM memory 205 using 4-bit bursts. As is known, DQS 240 and DQ 245 may be replicated many times across a DRAM memory chip, e.g. 4 data strobes for 32-bit memory accesses. However, such details are not shown in FIG. 3A for the sake of clarity of description. FIG. 3B illustrates a simplified exemplary expansion of strobe/data timing for rising and falling edges of DQS 240 and DQ 245 of FIG. 3A. As is apparent from FIGS. 3A and 3B, interface parameters such as slew rate and threshold voltage settings for DQS 240 and/or DQ 245 impact how the data is sampled. For example, setting the threshold voltage for DQS 240 to a higher value on a rising clock edge samples at a later time within DQ 245. Alternatively, setting the threshold voltage for DQS 240 to a higher value on a falling clock edge samples at an earlier time within DQ 245. Although FIG. 3B illustrates DQS 240 and DQ 245 as "clean" signals, at high speeds and/or as the eyes of the signals close, interface parameters such as slew rate and threshold voltage have strong influence on how the data is sampled.

With high-speed memory devices and ever increasing clock rates, minor interface variations can have significant impacts on timing in the interface between memory controller 210 and DRAM memory 205. Timing impacts can be different between rising and falling edges, may be different across byte lanes, and may impact some DRAM chips more so than others. Such timing variations may be caused by voltage drift, process variations, or temperature effects. Conventionally using predetermined interface parameters, stored in boot ROM, loaded upon initialization, and not updated during normal operation, ignores such interface variations.

Figure 4:
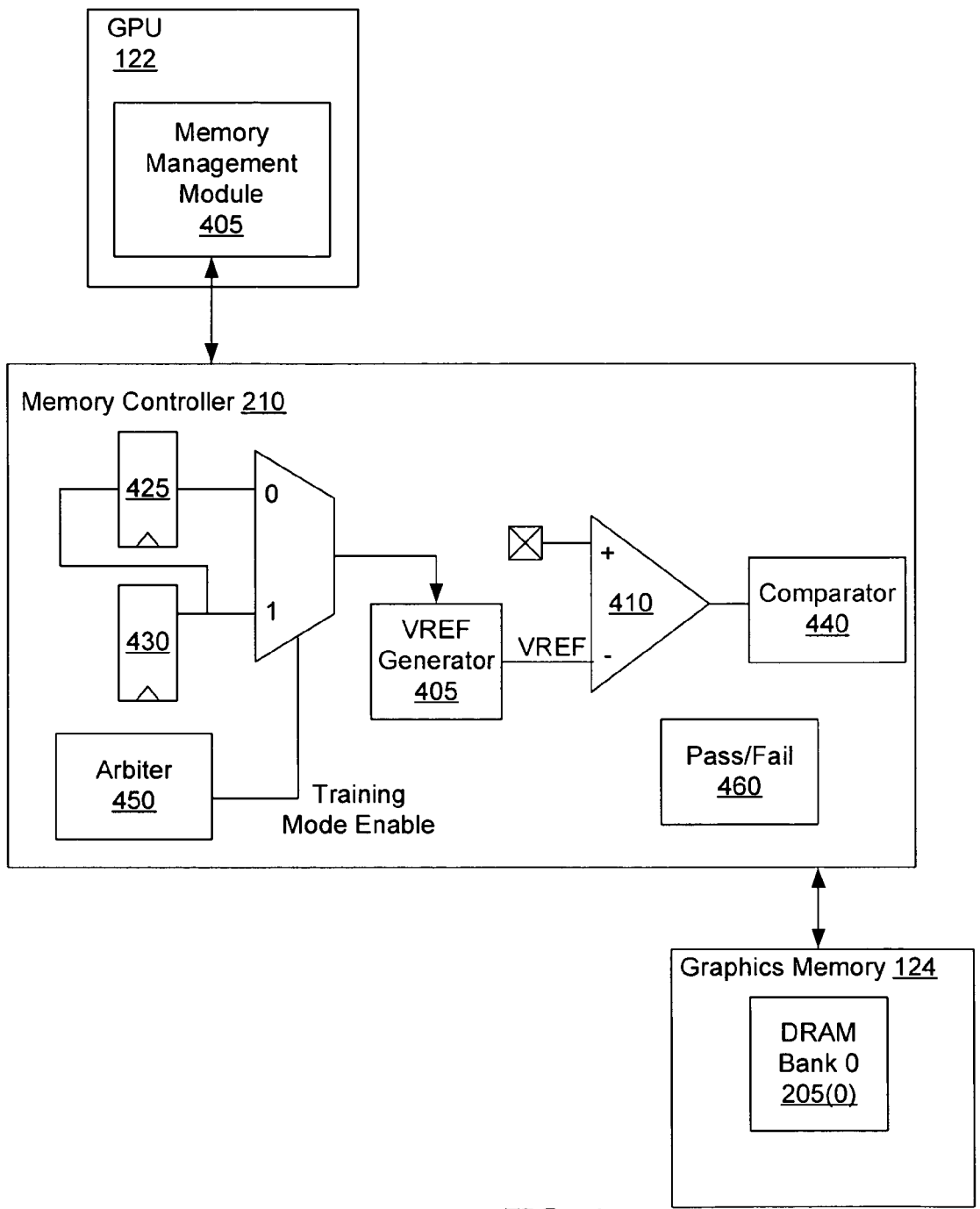
FIG. 4 illustrates a generalized block diagram of memory controller 210 of FIG. 2 in one embodiment in accordance with the present invention.

FIG. 4 illustrates a generalized block diagram of memory controller 210 of FIG. 2 in one embodiment in accordance with the present invention. In contrast to a conventional memory controller with predetermined interface parameters, memory controller 210 is configured to respond to or adapt to changes in operational conditions caused by such effects as voltage changes, temperature swings, or process variations. Such changes may occur in any of the various components of memory controller 210, DRAM memory 205, or the interface (e.g. printed circuit board) between the memory controller 210 and the DRAM memory 205.

For the "normal operating mode" of computer system 100, memory controller 210 includes operational mode registers 425 configured to supply interface parameters to appropriate components that control the interface to graphics memory 124. Upon initialization, for example, memory management module 405 on GPU 122 is configured to load interface parameters (e.g., based upon boot ROM) into operational mode registers 425. The interface parameters stored in operational mode registers 425 are used to control the interface to graphics memory 124, with appropriate timing and other interface parameters.

For example, with respect to a memory read requested by a process (not shown) running on GPU 122, logic circuits (not shown) in memory controller 210 generate appropriate signals to graphics memory 124. E.g., memory controller 210 generates appropriate signals for DQS 240, DQ 245, address and control bus 250 (FIG. 3A) to DRAM memory 205(0), so that data may be read from the memory.

To determine the state of the data read from DRAM memory 205(0), a voltage reference (VREF) interface parameter stored in operational mode registers 425 drives VREF generator 405. VREF generator 405 is configured to output a corresponding VREF signal (DC voltage level) into differential receiver 410. The data bit read from DRAM memory 205(0) is compared in differential receiver 410 to the VREF signal, and a logic "1" or "0" is output from memory controller 210 to the process running on GPU 122 that requested the data.

Referring to FIG. 3B and FIG. 4, the value of VREF programmed into operational mode registers 425 influences timing in the interface between memory controller 210 and DRAM memory 205(0). In other words, the value of VREF programmed into operational mode register 425 will affect the characteristics of the data signal output from differential receiver 410.

The VREF interface parameter is merely one example of the values stored in operational mode registers 425. Not shown in FIG. 4 for the sake of clarity, other parameters such as timing skews or delays (e.g., DQ delay, DQS delay, etc.) are stored in operational mode registers 425. Such interface parameters may conform to those determined by standards bodies such as JEDEC, for example, or may include other parameters for a custom memory interface.

On the Fly Tuning of Dram Interface Parameters

As temperature and/or voltage vary in computer system 100, interface characteristics typically change between memory controller 210 and graphics memory 124. Such interface changes may cause the predetermined interface parameters stored in operational mode registers 425 to be suboptimal. For example, as temperature increases in computer system 100, the VREF parameter stored in operational mode registers 425 may become suboptimal with respect to the change in the interface between memory controller 210 and graphics memory 124.

Alternatively, it may be that a particular DRAM chip might perform better with other than the predetermined interface parameters determined for a broad range of DRAM chips. For example, it may be empirically determined that DRAM memory 205(0) performs better by sampling a data bit nearer the trailing edge rather than centered between the leading and trailing edges, because DRAM memory 205(0) may have a much larger setup requirement than hold requirement, regardless that a datasheet for DRAM memory 205(0) states that the setup and hold are the same.

As described further below, to tune the interface parameters stored in operational mode registers 425, memory management module 405 on GPU 122 is configured to command memory controller 210 to enter the training mode. As enabled by arbiter logic 450 as described further below, memory controller 210 is configured to inhibit the operational mode safely (without interference to operational processes) and enter the training mode. In the training mode, memory controller 210 is configured to drive test scenarios against memory such as DRAM memory 205(0) with a hardware based "inner training loop" that includes training mode registers 430, comparator 440, and pass/fail result registers 460.

Training mode registers 430 are configured to temporarily store training values and patterns used to tune the interface parameters between memory controller 210 and graphics memory 124. To "stress test" the interface between memory controller 210 and graphics memory 124, patterns may be programmed that maximally stress the interface. In one embodiment, a training pattern is loaded into training mode registers 430 as 16 registers of 16 bits each, driving a 64-bit wide memory interface. If the pattern to be generated is longer than 64 bits, the training pattern loaded into training mode registers 430 may be repeatedly cycled. Patterns that cause maximal stress include those with many transitions, for example a "checkerboard" pattern (e.g., 0xFF00FF00FF00 . . . ). Patterns are desired that cause high intersymbol interference (ISI), high levels of crosstalk, patterns that generate high levels of power supply noise, and the like. The pattern may include any bit pattern, and the pattern may be determined experimentally or by simulation.

In the training mode, patterns and training values (also referred to as training parameters) from training mode registers 430 are loaded into logic circuits in memory controller 210 to generate appropriate signals to graphics memory 124. Comparator 440 is configured to compare the data written to graphics memory 124 to the data read back from graphics memory 124. Depending on errors between the write and the read, comparator 440 is configured to store a "pass" or "fail" in appropriate pass/fail result registers 460.

In some embodiments, pass/fail registers 460 are configured to separately store pass/fail status on each byte lane of graphics memory 124.

Since different interfaces are used for "inbound traffic" (reads from graphics memory 124 to memory controller 210) and for "outbound traffic" (writes from memory controller 210 to graphics memory 124), the inner training loop is configured to separate read errors from write errors. To separately analyze read errors from write errors, data may be written to a particular byte lane of graphics memory 124 with "conservative" settings, and read back from the byte lane of graphics memory 124 with "aggressive" settings, or vice versa. In some embodiments, pass/fail result registers 460 are configured to store pass/fail status on reads separately from pass/fail status on writes, so that read errors can be distinguished from write errors.

Further, as noted above with respect to FIG. 3B, rising edges may be more or less sensitive to some interface parameters than falling edges. Therefore, pass/fail result registers 460 in some embodiments are configured to separately store pass/fail status on rising and falling edges, so that rising edge errors can be distinguished from falling edge errors.

As an example of the operation of the inner training loop, training mode registers 430 may be programmed by memory management module 405 with one or more training values of VREF to be tested against a particular byte lane of DRAM memory 205(0). For example, training values of VREF may be programmed into training mode registers 430 that vary VREF by up to +10% and −10%, to find a window outside of which the interface between memory controller 210 and DRAM memory 205(0) fails. A first training value of VREF is loaded into VREF generator 405 and data is written to a particular byte lane of DRAM memory 205(0). The data is read back and, using the training value of VREF driving differential receiver 410, compared to the conservatively written data in comparator 440. Comparator 440 determines whether the data read back from the byte lane of DRAM memory 205(0) matches the data written to the byte lane of DRAM memory 205(0). Depending on the comparison, comparator 440 generates an error status for the byte lane. The error status is stored in one or more of pass/fail result registers 460, and the training continues for subsequent training values loaded into training mode registers 430. In this fashion, a "passing window" may be determined for the particular byte lane of DRAM memory 205(0). For example, it may be determined that a particular byte lane of DRAM memory 205(0) operates successfully within a passing window of up to VREF+8% and down to VREF−3%.

Based on the state of pass/fail result registers 460 after the inner training loop has completed a training pass, the training values stored in training mode registers 430 may be used to overwrite the interface parameters stored in operational mode registers 425, as described below with respect to FIG. 5.

Persons of ordinary skill will recognize many variations on the inner training loop described with respect to FIG. 4. For example, in similar fashion to that described above with respect to VREF, memory controller 210 in various embodiments is configured to tune VREF separately for DQS 240, DQ 245, inbound and outbound strobe delays (e.g. DQS inbound, rise & fall), WDAT delay, trim & select. In some embodiments, other interface parameters in addition to those described above may be tuned in similar fashion to that described herein. For example, interface parameters such as preemphasis, equalization, driver characteristics (rise/fall, impedance, slew rates, etc.) may be tuned on the fly with similar mechanisms to those described above.

Although memory controller 210 is described as tuning interface parameters on a byte lane basis, in some embodiments memory controller 210 tunes interface parameters ranging from a per-chip basis (e.g., a voltage reference for a chip is tuned and all other parameters are not tuned) down to a per-bit basis. The inner training loop described with respect to FIG. 4 may be replicated in parallel many times within memory controller 210. For example with DRAMs having a VREF input that covers an entire data bus with one VREF pin per 32 bits, then memory controller 210 might have multiple VREF inner training loops. Particular implementation details are omitted for clarity and are considered to be within the scope of understanding of a person of ordinary skill in the art given the above description. Variations are considered to be numerous, and by no means should the claims be limited to the disclosed embodiments.

Algorithms for the inner training loop may or may not conform to those specified by standards bodies such as JEDEC. For example, some training algorithms may be specific to the computer system 100 or specific to non-standardized implementations of memory.

In addition to the inner training loop described with respect to FIG. 4, software components such as memory management module 405 can be considered as part of an "outer" training loop. As described further below, the outer training loop implements the following procedure:

(1) set the training mode registers 430 to experimental values to test inbound and outbound dlcell settings, trimmer settings, VREF settings, and the like;

(2) call the training mode registers 430 to do a read/write/ write & read sequence with a predetermined data pattern;

(3) collect the status of each byte lane on each partition in graphics memory 124;

(4) repeat steps (1) through (3) as necessary; and (5) determine optimal values to be used in operational mode registers 425 based on the results of the training. For example, based on errors deleted in the inner training loop due to extremes in temperature, the outer training loop may determine to use parameters that are significantly more "conservative" than those stored in boot ROM. Alternatively, lack of errors due to particularly well-matched components and cool temperatures, for example, may cause the outer training loop to use parameters that are significantly more "aggressive" than those stored in boot ROM.

Figure 5:
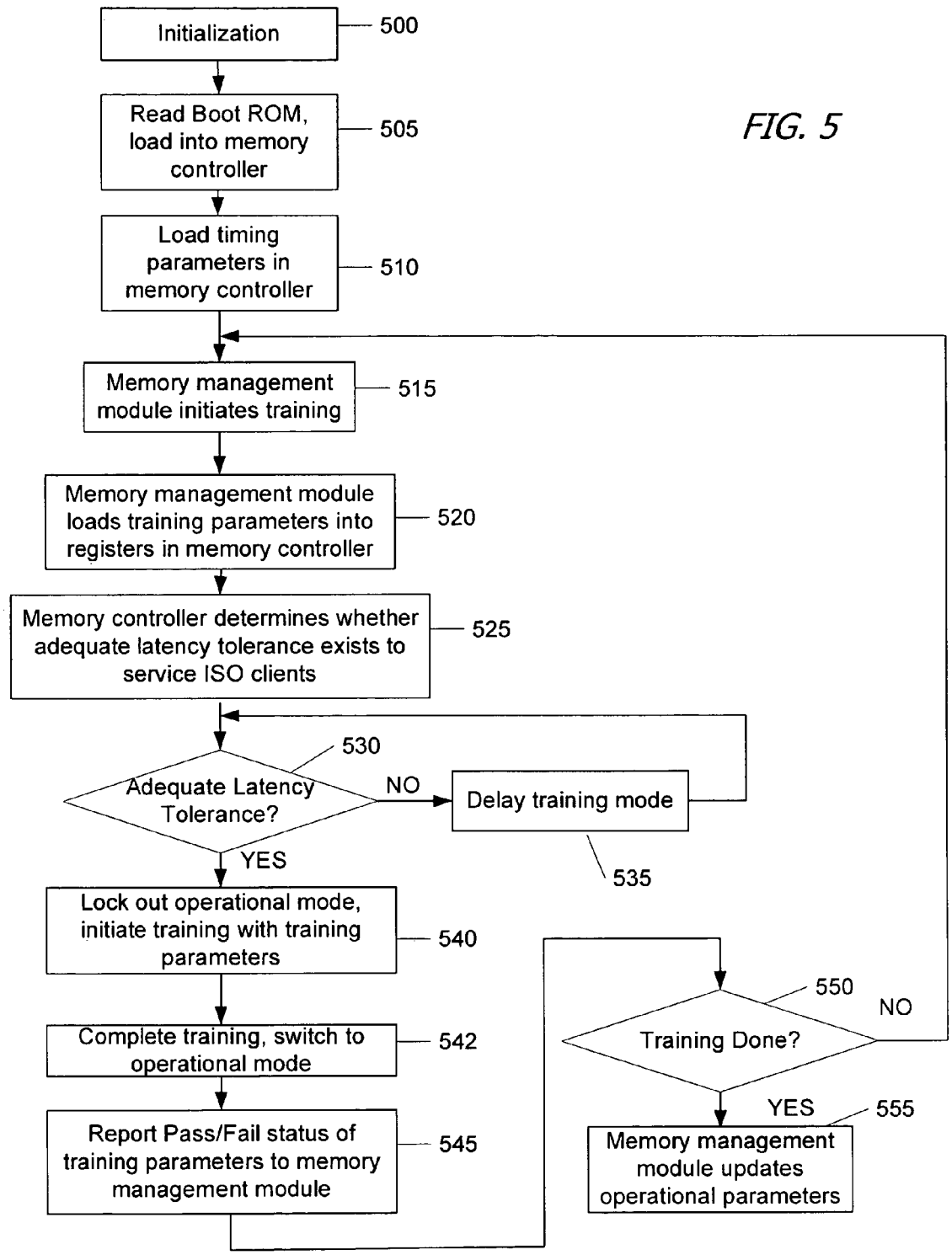
FIG. 5 illustrates an outer training loop method for tuning one or more interface parameters between memory controller 210 and graphics memory 124 of FIG. 4, in one embodiment in accordance with the present invention.

FIG. 5 illustrates an outer training loop method for tuning one or more interface parameters between memory controller 210 and graphics memory 124 of FIG. 4, in one embodiment in accordance with the present invention. At step 500, system 100 initializes, for example upon a power on reset. At step 505, memory management module 405 reads boot ROM, and at step 510, loads initial values of interface parameters into operational mode registers 425 of memory controller 210.

At step 515, memory management module 405 determines to initiate training. In some embodiments, training is scheduled as a periodic process, running on the order of once every second or two. In other embodiments, training may be initiated based upon interrupts or other status indicators in system 100, such as a cooling fan for GPU 122 turning on that signifies a change in temperature, or the like. Advantageously, because training is scheduled relatively infrequently, there is relatively little memory bandwidth used for training and negligible impact on operational processes running on GPU 122.

At step 520, memory management module 405 loads training parameters into training mode registers 430 of memory controller 210. Memory management module 405 then commands memory controller 410 to initiate training mode. At steps 525 to 530, arbiter logic 450 of memory controller 410 determines whether to initiate or delay the training mode based on processes running in GPU 122 and bandwidth requirement "contracts" specified for the processes. In some embodiments, GPU 122 supports one or more "isochronous clients" (e.g., real time clients such as display refresh or video capture), and one or more non-isochronous ("non-iso" or non-real time) clients. Typically, the non-iso clients may be delayed during the training mode without impact; as long as the non-iso clients are allowed to make some progress, the non-iso clients can be delayed as necessary to allow the training mode to progress. In contrast, the isochronous clients may be guaranteed a minimum bandwidth from GPU 122 to graphics memory 124, such that the training mode must not violate the bandwidth contract.

Therefore, at steps 525 to 530, arbiter logic 450 performs one or more analyses or handshakes to guarantee that the isochronous clients can run within their given bandwidth contract for the duration of the upcoming training mode. In some embodiments, arbiter logic 450 is configured to evaluate the current size, free space, and utilization of memory buffers allocated to the isochronous clients, to prevent impact to the isochronous clients. Arbiter logic 450 verifies whether adequate latency tolerance is available for the isochronous clients. To provide adequate latency tolerance, isochronous read clients should have sufficiently full buffers, whereas isochronous write clients need sufficiently empty buffers.

In other embodiments, prior to initiating the inner hardware training loop, arbiter logic 450 is configured to stop servicing other clients and service only isochronous clients if buffer requirements fall below appropriate latency tolerance thresholds. In other words, arbiter logic 450 may direct logic within memory controller 210 to stop servicing other clients and service only isochronous clients until the isochronous clients are above their latency tolerance thresholds.

In still further embodiments, arbiter logic 450 can determine whether GPU 122 is in an enhanced or maximum latency tolerance mode. For example, GPU 122 in some embodiments has two graphics rendering heads, each of which can perform base, overlay, and cursor processing. Arbiter logic 450 can detect whether cursor processing is absent, so that latency tolerance is enhanced. With enhanced or maximized latency tolerance, a given amount of memory buffer space "lasts" relatively longer.

If arbiter logic 450 determines that there is insufficient latency tolerance to guarantee successful performance of the memory contracts with the isochronous clients, then at step 535 the arbiter logic 450 delays the entry into the training mode.

On the other hand, if there is sufficient latency tolerance so that the isochronous (read and/or write) clients will not be negatively impacted by the training mode, then at step 540, arbiter logic 450 inhibits all clients from accessing memory and initiates the inner hardware training loop. Arbiter logic 450 locks out operational mode accesses to memory because the training loop is expected to cause bit errors, which may adversely impact any operational mode access.

At step 542, after completion of one or more cycles of the inner hardware training loop as described with respect to FIG. 4, arbiter logic 450 completes training and switches back to operational mode. At step 545, arbiter logic 450 informs memory management module 405 of the results of the training mode.

At step 550, a determination is made whether training is completed. If not, then training continues.

If training is completed, then at step 555, memory management module 405 may determine to overwrite one or more of the operational mode registers 425 with training values held in training mode registers 430. In some embodiments, updating of the operational mode parameters occurs as a separate process initiated by memory management module 405 based upon a determination of the optimal set of values found during the training mode. Generally, updating of the operational mode parameters should not occur while DRAM traffic is being transferred, so overwrite of operational mode registers 425 is delayed until a "guaranteed safe" time, such as at the next DRAM refresh command.

Alternative Embodiments

Although described with respect to a graphics processing unit accessing graphics memory, the systems and methods described herein are applicable to any high speed memory that is desired to incorporate adaptive tuning of DRAM interface parameters. Advantageously, adaptive tuning allows memory to operate error-free over wide range of operating conditions.

In some embodiments, rather than arbiter logic 450 (FIG. 4) providing a real-time analysis of memory buffer states to arbitrate lockout of the operational mode and entry into the training mode, an operating system component in GPU 122 may perform the arbitration process in software. For example, the operating system component can inhibit operational mode accesses to memory for the duration of the training mode. Thus, the arbitration logic can be performed in software rather than in hardware. Alternatively, the arbitration logic may be performed with virtually any combination of software elements and hardware elements.

In some embodiments, in addition to tuning of timing skews, voltage references, and the like with fixed clock frequencies to graphics memory 124, clock frequencies are "interface parameters" that may be tuned indirectly. For example, tuning the interface parameters (timing skews, voltage references, and the like) results in improved error margins which may be used to support higher clock frequencies. In some embodiments, resource management components of GPU 122 may therefore raise clock frequencies to increase memory bandwidth, based upon tuning of timing skews and voltage references.

For example, with a relatively large number of errors in pass/fail results registers 460 based upon one or more passes of the inner training loop, memory management module 405 may determine that graphics memory 124 should use conservative interface parameters in operational mode registers 425. In such case, memory management module 405 may coordinate with other resource management components of GPU 122 to reduce the frequency of memory clocks in computer system 100. Alternatively, if the interface between memory controller 210 and graphics memory 124 is particularly well matched and provides relatively few errors even with aggressively tuned interface parameters in operational mode registers 425, memory management module 405 may determine to initiate a procedure to increase memory clock frequencies and take advantage of the wide passing range on the interface parameters.

Such clock frequency manipulation may depend upon considerations such as DLL clock reset periods, or other circuits using the same clocks as the memory, for example. Where DLL clock reset periods take significant time, resource management components of GPU 122 may determine to increase or decrease the clock frequencies during a time that the DLL clock reset may be unobtrusive, such as during a blanking interval.

A potential advantage to the systems and methods described herein is that the training mode comprises an insubstantial portion of overall memory bandwidth in some embodiments, and can be considered as transparent to the normal operational mode. Another potential advantage is that significant time may be saved during the characterization process, e.g. in measuring many different controller/memory interface combinations to determine appropriate configuration parameters to be saved in boot ROM.

While the invention has been described with respect to specific embodiments, one skilled in the art will recognize that numerous modifications are possible. Thus, although the invention has been described with respect to specific embodiments, it will be appreciated that the invention is intended to cover all modifications and equivalents within the scope of the following claims.

What is claimed is:

1. A system, comprising:
 a memory;
 a processor configured to request an access to the memory; and
 a memory controller configured to:
  couple the processor to the memory using one or more interface parameters in an operational mode; and
  inhibit the operational mode to enter a training mode that tunes the one or more interface parameters used in the operational mode,
 wherein the processor is further configured to execute instructions of a memory management module to command the memory controller to initiate the training mode, and wherein the memory management module includes:
  one or more first instructions configured to load into the memory controller one or more first parameters to be used during the training mode; and
  one or more second instructions configured to determine parameters to be used during a subsequent operational mode.

2. The system of claim 1 wherein the memory management module includes instructions to load one or more parameters into the memory controller for use during an upcoming training mode.

3. The system of claim 1 wherein the interface parameters include one or more of a rise delay, a fall delay, a data strobe delay, and a voltage reference for data and/or data strobe.

4. The system of claim 1 wherein the training mode comprises per-byte-lane tuning of one or more of strobes and data bits.

5. The system of claim 1 wherein the memory controller includes one or more registers to store one or more parameters used in the training mode.

6. The system of claim 1 wherein the memory controller is further configured to write a training pattern to the memory using conservative interface parameters, read back from the memory using aggressive interface parameters, compare the written pattern to the read pattern, and determine a pass/fail characteristic.

7. A system, comprising:
 a memory
 a processor configured to request an access to the memory; and
 a memory controller configured to:
  couple the processor to the memory using one or more interface parameters in an operational mode;
  inhibit the operational mode to enter a training mode that tunes the one or more interface parameters used in the operational mode; and
  delay entry of the training mode based on an analysis of one or more memory buffers used in the operational mode.

8. The system of claim 7 wherein the analysis of the memory buffers includes one or more of an underflow on a read client and an overflow on a write client.

9. A memory controller configured to:
 couple a processor to a memory in an operational mode using one or more interface parameters;
 inhibit the operational mode to enter a training mode that tunes the one or more interface parameters used in the operational mode; and
 delay the initiation of the training mode based on an analysis of one or more memory buffers used in the operational mode.

10. The memory controller of claim 9 wherein the interface parameters include one or more of a rise delay, a fall delay, a data strobe delay, and a voltage reference for data and/or data strobe.

11. The memory controller of claim 9 further configured to tune the one or more interface parameters on one or more of a per-byte-lane basis, a per bit basis, or a per chip basis.

12. The memory controller of claim 9 further including one or more registers to store one or more parameters used in the training mode.

13. A memory controller configured to:
couple a processor to a memory in an operational mode using one or more interface parameters; and
inhibit the operational mode to enter a training mode that tunes the one or more interface parameters used in the operational mode,
wherein the memory controller includes one or more registers to store the one or more parameters on a byte lane basis.

14. A method, comprising:
coupling a processor to a memory with a memory controller using one or more interface parameters in an operational mode; and
inhibiting the operational mode to enter a training mode that tunes the one or more interface parameters used in the operational mode,
wherein inhibiting the operational mode comprises determining based on an analysis of one or more buffers used during the operational mode whether to enter or delay the training mode.

15. The method of claim 14 wherein the training mode includes:
utilizing one or more training parameters for writing and/or reading a test pattern from the memory controller to the memory;
determining whether the training parameters result in one or more errors; and
reporting the one or more errors to a memory management module executing on the processor.

16. A method, comprising:
coupling a processor to a memory with a memory controller using one or more interface parameters in an operational mode; and
inhibiting the operational mode to enter a training mode that tunes the one or more interface parameters used in the operational mode, wherein inhibiting the operational mode comprises inhibiting an isochronous process executing on the processor.

* * * * *

UNITED STATES PATENT AND TRADEMARK OFFICE
CERTIFICATE OF CORRECTION

PATENT NO.      : 7,647,467 B1
APPLICATION NO. : 11/642368
DATED           : January 12, 2010
INVENTOR(S)     : Hutsell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 493 days.

Signed and Sealed this

Twenty-eighth Day of December, 2010

David J. Kappos
*Director of the United States Patent and Trademark Office*